(12) United States Patent
Lopez

(10) Patent No.: US 8,147,296 B2
(45) Date of Patent: Apr. 3, 2012

(54) METHOD AND GRINDING MACHINE FOR DRESSING OF A GRINDING TOOL

(75) Inventor: Jose Lopez, Meeder (DE)

(73) Assignee: KAPP GmbH, Coburg (DE)

( * ) Notice: Subject to any disclaimer, the term of this patent is extended or adjusted under 35 U.S.C. 154(b) by 901 days.

(21) Appl. No.: 12/109,627

(22) Filed: Apr. 25, 2008

(65) Prior Publication Data

US 2008/0264401 A1 Oct. 30, 2008

(30) Foreign Application Priority Data

Apr. 27, 2007 (DE) .......................... 10 2007 020 479

(51) Int. Cl.
*B24B 1/00* (2006.01)
(52) U.S. Cl. ..................... 451/56; 125/11.03; 125/11.13
(58) Field of Classification Search ............... 125/11.03, 125/11.13; 451/56
See application file for complete search history.

(56) References Cited

U.S. PATENT DOCUMENTS

| | | | | |
|---|---|---|---|---|
| 2,515,091 A | * | 7/1950 | May ................................ 451/72 |
| 2,571,293 A | * | 10/1951 | Ross .......................... 125/11.03 |
| 3,553,893 A | * | 1/1971 | Stade .............................. 451/56 |
| 4,502,456 A | * | 3/1985 | Janutta et al. ............. 125/11.03 |
| 6,012,972 A | * | 1/2000 | Jankowski ....................... 451/48 |
| 6,077,150 A | * | 6/2000 | Jankowski ....................... 451/47 |
| 6,390,894 B1 | * | 5/2002 | Beel et al. ......................... 451/47 |
| 6,491,568 B1 | * | 12/2002 | Jankowski ......................... 451/5 |
| 7,121,930 B2 | * | 10/2006 | Thyssen .......................... 451/56 |
| 7,198,543 B2 | * | 4/2007 | Yanase et al. ...................... 451/5 |
| 2008/0268750 A1 | * | 10/2008 | Fisher et al. ...................... 451/5 |
| 2008/0268756 A1 | * | 10/2008 | Schenk .......................... 451/177 |

FOREIGN PATENT DOCUMENTS

| | | |
|---|---|---|
| DE | 196 19 401 C1 | 11/1997 |
| DE | 196 24 842 | 1/1998 |
| DE | 196 24 842 A1 | 1/1998 |
| DE | 199 07 363 A1 | 8/2000 |
| DE | 699 17 012 | 4/2005 |
| DE | 10 2005 030846 A1 | 2/2006 |
| WO | 2006/082470 | 8/2006 |

\* cited by examiner

*Primary Examiner* — Maurina Rachuba
(74) *Attorney, Agent, or Firm* — Lucas & Mercanti, LLP

(57) ABSTRACT

The invention relates to a method and machine for the dressing of a grinding tool (1), which has at least one tooth-shaped profile (2) with a first flank (3) and an opposing second flank (4). A disk-shaped dressing tool (5) used for dressing of the grinding tool (2) has a first abrasive area (6) and a second abrasive area (7). To allow a faster and thus more economical dressing of the grinding tool, the first abrasive area (6) contacts the first flank (3) and the second abrasive area (7) contacts the second flank (4) simultaneously, and the disc-shaped dressing tool (5) and/or the grinding tool (1) are pivoted relatively to another around an axis (A) being arranged perpendicular to the axis of rotation (C) of the grinding tool (1), so that both flanks (3, 4) are dressed simultaneously.

10 Claims, 2 Drawing Sheets

(State of the art)

METHOD AND GRINDING MACHINE FOR DRESSING OF A GRINDING TOOL

Figure 1:
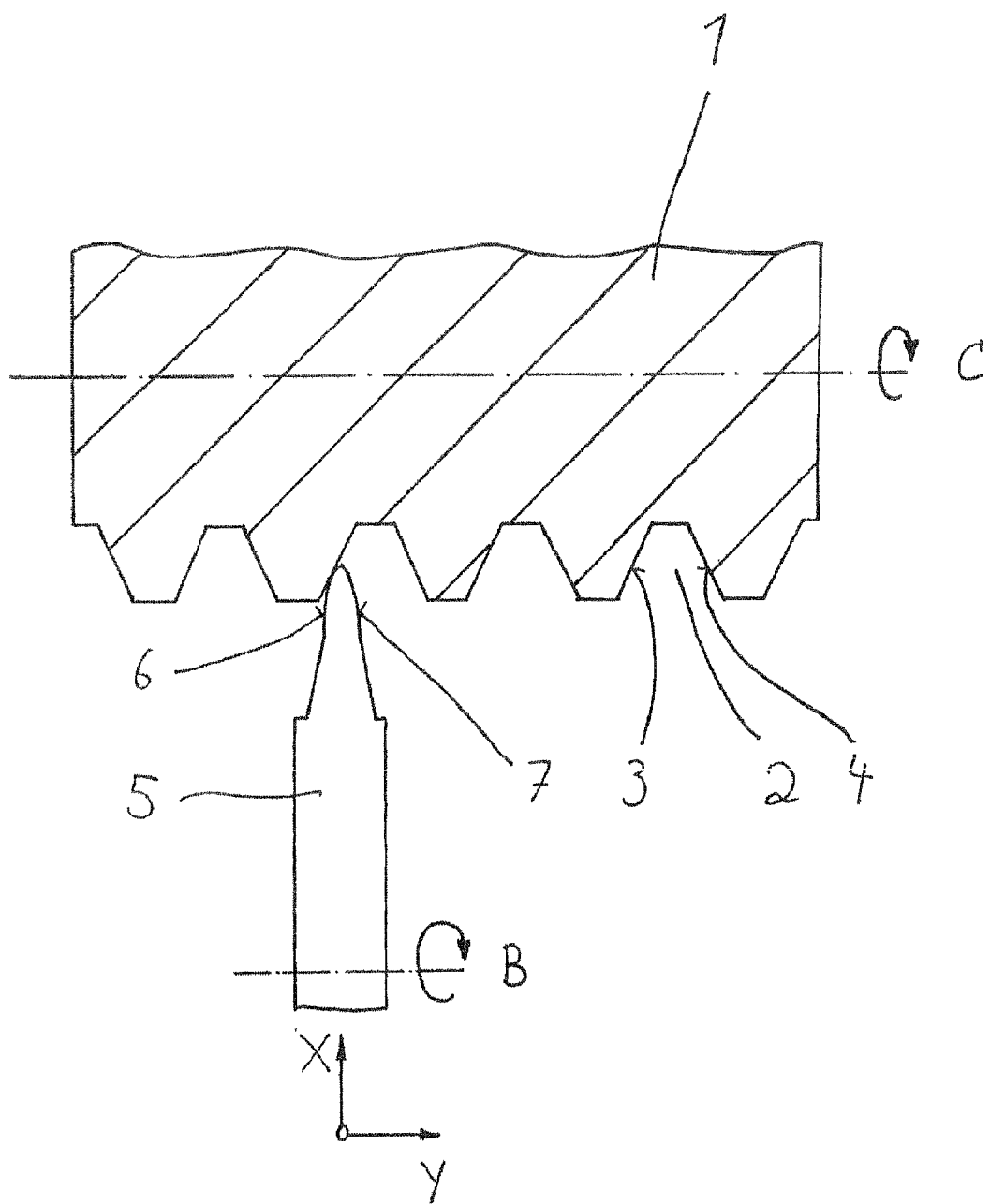

The invention relates to a method for the dressing of a grinding tool, which has at least one tooth-shaped profile in an axial section, wherein the tooth-shaped profile has a first flank and a second flank being arranged opposed to the first flank, which form the boundary of the tooth-shaped profile, wherein a disk-shaped dressing tool is used for dressing of the grinding tool, the disk-shaped dressing tool having a first abrasive area and a second abrasive area, wherein the dressing tool, having a relative velocity between the abrasive areas and the tooth-shaped profile, is guided relatively to the grinding tool, so that a desired shape of the flanks is obtained, wherein the first abrasive area is assigned to the first flank and the second abrasive area is assigned to the second flank. Furthermore, the invention relates to a grinding machine for performing the method.

In the production of gears the final process of manufacturing has a major relevance. During the final process of manufacturing the flanks of the tooth are grinded, by which they are brought to the exact contour. Often, corrections of the profile are desired which go beyond the form of the tooth involute to influence the operation of the gearing positively.

An efficient method for producing the gearing is the generative grinding by means of a grinding worm. Here, the gear to be machined is in contact with the grinding worm, so that an allowance on the tooth flanks is removed by the abrasive material of the grinding worm.

To ensure a sufficient quality of the gearing the working areas of the grinding worm (i.e. the tooth-shaped profile of the grinding worm) must be brought again to the desired shape after a certain number of grinded work pieces. For this a dressing process is necessary, for which a profile dressing method or a dressing process with dressing fine by line can be employed. In the case of profile dressing the dressing tool has fine contact with the flanks of the tooth-shaped profile of the grinding tool, whereas in the case of dressing line by line a punctual contact is given.

Indeed, the dressing fine by line requires a longer dressing time compared to the profile dressing method. But the advantage of the dressing line by line is that without big efforts modification of the profile can be realized.

It is known in the art to dress the contour of the flank of the tooth-shaped profile line by line with a suitable dressing wheel, which especially has a circular or arcuated region in an axial section and which is provided with hard material. This has to be done firstly of one of the flanks and then for the opposing other flank.

It is a disadvantage of this method that for this a respective time is necessary, so that the grinding method is expensive accordingly.

It is an object of the present invention to further develop a method of the kind mentioned above, so that is becomes possible, to carry out the dressing of the grinding tool operation with the same quality in shorter time. For doing so, the principle of the dressing line by line should be kept, to stay flexible with regard to modification in the profile. Furthermore, a respective grinding machine should be proposed.

The solution of this object according to the invention is characterized in that at least along a pale of the height of the tooth-shaped profile preferably along the entire height of the profile the disc-shaped dressing tool is guided in such a way that the first abrasive area contacts the first flank and the second abrasive area contacts the second flank simultaneously, whereto the disc-shaped dressing tool and/or the grinding tool are pivoted relatively to another around an axis being arranged perpendicular to the axis of rotation of the grinding tool, so that both flanks are dressed simultaneously.

The idea according to the invention is thus basing on the fact that the dressing tool—being arranged in the tooth gap—is swiveled around a transversal axis in such a way that dressing contact is established at the front side and at the rear side of the dressing tool simultaneously. By doing so both flanks of the tooth-shaped profile can be shaped simultaneously, what allows a significant reduction of the dressing time.

Preferably, the disc-shaped dressing tool rotates around an axis of rotation, wherein the axis of rotation of the grinding tool and the axis of rotation of the dressing tool define a plane in the not pivoted state, which contains the axis, around which the disc-shaped dressing tool and/or the grinding tool is pivoted.

According to an embodiment of the invention the disk-shaped dressing tool is pivoted relatively to the grinding tool (grinding worm), which rotates but which is not pivoted. Alternatively, the grinding tool is pivoted relatively to the disc-shaped dressing tool.

The grinding tool is preferably a single-thread or multiple-thread grinding worm for grinding of a gear by the method of generative grinding.

During dressing a substantially punctual contact exists between the flanks of the grinding tool and the abrasive areas of the dressing tool according to a preferred embodiment of the invention. By doing so it can be provided that the dressing is carried out by performing a plurality of dressing passes, in which the dressing tool is moved relatively to the grinding tool in axial direction with a respective constant radial infeed.

Preferably, the disc-shaped dressing tool rotates during the dressing process around an axis of rotation.

The proposed method is specifically economical if it is performed with a pre-profiled grinding worm for creating profile modification on the flanks of the grinding worm.

Also, the root region and/or the tip region of the tooth-shaped profile can be dressed by pivoting of the dressing tool around the axis, which is perpendicular on the axis of rotation of the grinding tool.

Alternatively, the tip region of the tooth-shaped profile can be dressed by using a dressing bar.

Thus, the tip region of the grinding worm can be dressed with the topological dressing tool or with a dressing bar. If the root region of the gear, which has to be grinded, is not machined the grinding worm can be dressed at the outer diameter in a straight or linear way. For doing this a preferred embodiment of the invention suggests to use a dressing tool being a dressing bar (or dressing spacer/dressing lineal) by which the whole width of the grinding worm is dressed simultaneously. This requires only a part of the time which would be necessary to employ the topological dressing tool.

Thus, for dressing the root region and/or tip region of the grinding worm the grinding worm or dressing tool is pivoted according to a possible solution around the axis of rotation as explained. The dressing of the tip region can also be done using only one flank of the dressing tool.

The suggested grinding machine for performing the method has a grinding tool being a grinding worm, which is arranged on a grinding spindle which is rotating around an axis of rotation, which has a disk-shaped dressing tool, which is arranged on a dressing spindle which is rotating around an axis of rotation, wherein linear guides are arranged for moving the dressing tool relatively to the grinding worm in an axial direction and for adjusting the dressing tool in radial direction to a distance of the axes. According to the invention it is suggested that pivoting means are arranged which are driven by means of an electric motor for pivoting the dressing tool and/or the grinding worm around an axis being perpendicular to an axis or rotation of the grinding worm, wherein the pivoting angle is adjusted by a machine control at least dependent from the actual distance of the axes (in direction X) of the dressing tool relatively to the grinding worm.

Preferably, the pivoting means pivot the dressing tool and/or the grinding worm around an axis, which lies in a plane, which is defined by the axis of rotation of the grinding worm and of the axis of rotation of the disk-shaped dressing tool (in the not pivoted state).

With the suggested method it becomes possible to shorten the time for the dressing process significantly and to obtain the same quality of the dressing, because at least along a part of the height of the tooth-shaped profile of the tool (grinding worm) both of the opposing flanks of the tooth-shaped profile are dressed simultaneously. This was not possible till now.

By doing so, it is possible to reduce the dressing time up to the half. So, the cost effectiveness of the process is significantly increased.

Preferable, the invention is employed for the dressing of grinding weighs for carrying out the method of generative grinding of gears.

In the drawings an embodiment of the invention is illustrated.

Figure 2:
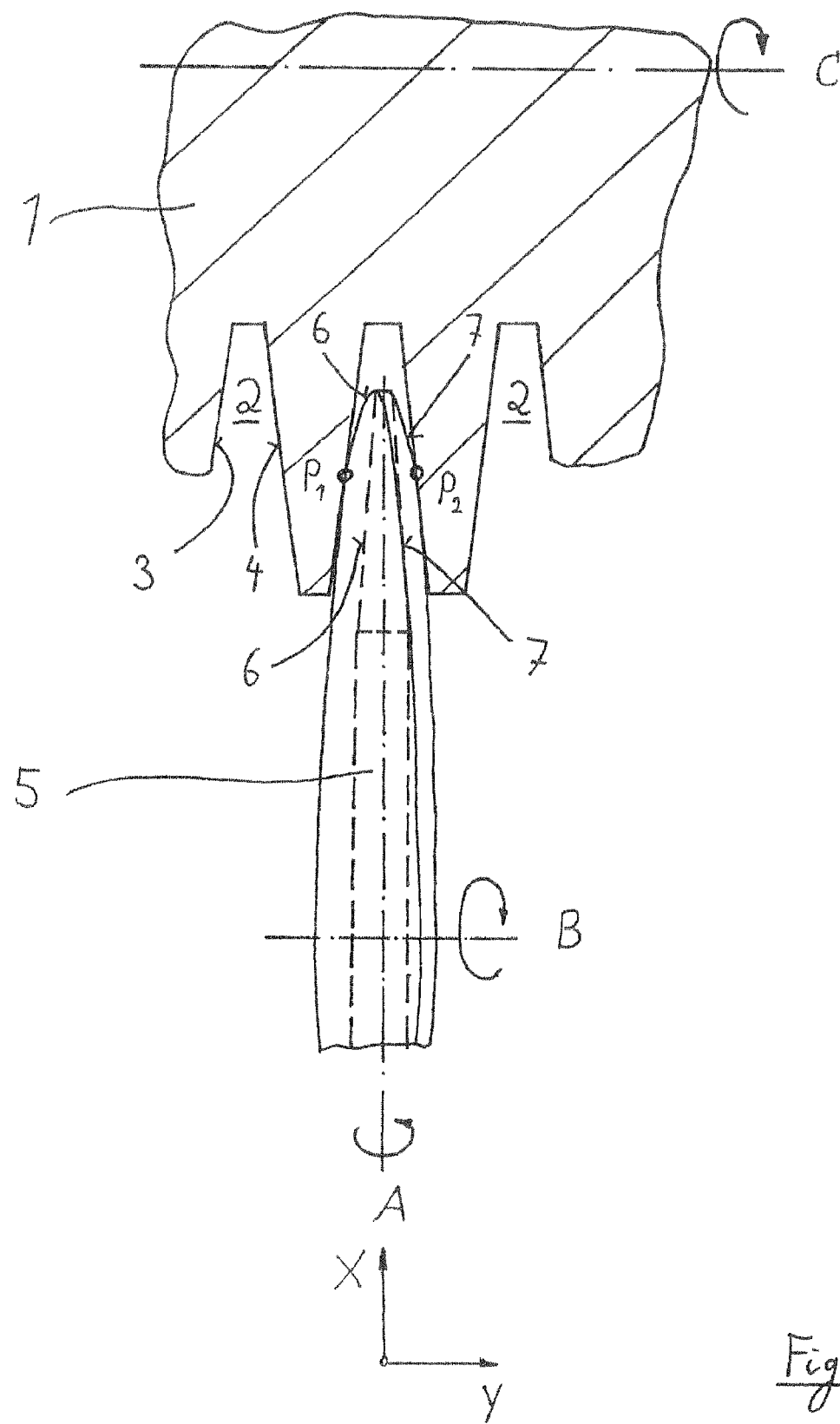

FIG. 1 shows an axial section of a grinding worm during the dressing process with a dressing tool according to the state of the art and FIG. 2 shows a depiction corresponding to that one of FIG. 1 during the dressing according to the invention.

In FIG. 1 the pre-known line by line dressing of a grinding tool 1 being a grinding worm is shown. The grinding worm 1 has a tooth-shaped profile 2 in the axial section, which is defined or bordered respectively by two flanks 3 and 4. The first flank 3 and also the second flank 4 have a substantial linear form in an axial section, but corrections are superposed to the substantial linear forms to obtain a corresponding counter profile at the finished, grinded gear. Both flanks 3 and 4 are arranged opposing each other—as can be seen.

To make sure that the tooth-shaped profile 2 has the desired precise form a dressing process is necessary, for which a disk-shaped dressing tool 5 is arranged. The dressing tool 5 has the depicted form according to FIG. 1 in an axial section, i.e. it has a first abrasive area 6 and a second abrasive area 7, which are arranged for the co-operation with the first flank 3 and with the second flank 4 respectively.

During the dressing process the grinding worm 1 rotates around the axis of rotation C and the rotation-symmetrical dressing tool 5 rotates around the axis of rotation B. When rotation around the axes B, C is established, the working region of the dressing tool 5, which is equipped with the abrasive areas 6, 7 is "contrived" into the worm thread of the grinding worm 1, i.e. the dressing tool 5 is moved in axial direction Y in dependence from the pitch of the worm and the rotational speed of the grinding worm 1. By doing so, at first the first flank 3 and then the second flank 4 are profiled line by line. I.e. after respective axial passes the dressing tool 5 is moved relatively to the grinding worm 1 radially in the direction of the infeed coordinate X, until the tooth-shaped profile 2 is dressed along its entire height.

Due to the solution according to the invention another process is employed see FIG. 2. The principle is kept that the dressing is carried out line by line, i.e. after the respective axial passes in the direction Y an infeed takes place in radial direction X.

But flow another axis of rotation is arranged around which the dressing tool 5 is swiveled relatively to the grinding worm 1 (or the grinding worm 1 is swiveled relatively to the dressing tool 5), namely the axis A. This axis is an axis of rotation which—as long as no pivoting took place yet between the grinding worm 1 and the dressing tool 5—lies preferably in that plane which is defined by the axis of rotation C of the grinding worm 1 and by the axis of rotation B of the dressing tool 5 in the state when no swiveling took place yet and which is perpendicular to the axis of rotation C and to the parallel axis of rotation B respectively.

Precisely, the axis A is the axis of rotation around the shortest connection (distance of the axes) between the axis of rotation C of the grinding worm 1 and the axis of rotation B of the dressing tool 5.

In FIG. 2 the axial section of the dressing tool 5 is shown with broken lines when the axes of rotation C and B are arranged parallel to another, i.e. when no swiveling is given yet. Then the dressing tool has the depicted abrasive areas 6 and 7 shown with broken lines which are required for the dressing line by line.

Now, the pivoting around the axis of rotation A takes place for a certain radial infeed X in such a way, that the first abrasive area 6 contacts the first flank 3 and simultaneously the second abrasive area 7 contacts the second flank 4. As can be seen in FIG. 2 a first point of contact $P_1$ is established between the first abrasive area 6 and the first flank 3 and simultaneously a second point of contact $P_2$ is established between the second abrasive area 7 and the second flank 4. The disk-shaped dressing tool 5 thus appears elliptical-shaped in FIG. 2 due to the pivoting angle.

Thus, for each radial position X another pivoting angle around the axis of rotation A is necessary to establish this condition. This is managed by a machine control (not depicted) in which the profile to be generated is stored.

It is the advantage that per each axial pass in direction Y one height of both flanks 3 and 4 is dressed, i.e. after only one pass the tooth-shaped profile 2 is dressed at both flanks 3, 4. So, approximately half of the dressing time can be saved, which makes the dressing process significantly more economical.

When performing the optional dressing of the tip region of the tooth-shaped profile 2 by means of a dressing bar or dressing ruler a bar equipped with a straight dressing edge is fed perpendicular to the axis of the grinding tool 1 in one single process step to dress the whole tip region at once completely, wherein the dressing bar remains parallel to the axis C. For doing so, the length of the dressing bar is preferably at least the width of the grinding tool 1.

LIST OF REFERENCE NUMERALS

1 Grinding tool (grinding worm)
2 Tooth-shaped profile
3 First flank of the tooth-shaped profile
4 Second flank of the tooth-shaped profile
5 Disk-shaped dressing tool
6 First abrasive area of the dressing tool
7 Second abrasive area of the dressing tool
X Radial infeed coordinate (direction of height of the profile)
Y Axial infeed coordinate
A Pivoting axis (swivel axis) of the dressing tool
B Axis of rotation of the dressing tool
C Axis of rotation of the grinding tool
$P_1$ First point of contact
$P_2$ Second point of contact

The invention claimed is:
1. Method for the dressing of a grinding tool, which has at least one tooth-shaped profile in an axial section, wherein the tooth-shaped profile has a first flank and a second flank being arranged opposed to the first flank, which form the boundary of the tooth-shaped profile, comprising: using a disk-shaped dressing tool for dressing of the grinding tool, the disk-shaped dressing tool having a first abrasive area and a second abrasive area wherein the dressing tool, having a relative velocity between the abrasive areas and the tooth-shaped profile, is guided relatively to the grinding tool, to shape the flanks, wherein the first abrasive area is assigned to the first flank and the second abrasive area is assigned to the second flank,
wherein
at least along a part of the height of the tooth-shaped profile the disk-shaped dressing tool is guided in such a way that the first abrasive area contacts the first flank and the second abrasive area contacts the second flank simultaneously, whereto one of or both of the disk-shaped dressing tool and the grinding tool are pivoted relatively to each other around a horizontal axis (A) so that both flanks are dressed simultaneously, wherein the disk-shaped dressing tool rotates around an axis of rotation (B), the grinding tool rotates around an axis of rotation (C), the axis of rotation (B) and the axis of rotation (C) define a plane in the non-pivoted state, the axis (A) is perpendicular to axis of rotation (C) and the axis (A) is contained in the plane.

2. Method according to claim 1 wherein the disk-shaped dressing tool is pivoted relatively to the grinding tool.

3. Method according to claim 1 wherein the grinding tool is pivoted relatively to the disk-shaped dressing tool.

4. Method according to claim 1, wherein the grinding tool is a single-thread or multiple-thread grinding worm for grinding of a gear by the method of generative grinding.

5. Method according to claim 1, wherein during dressing a substantially punctual contact exists between the flanks of the grinding tool and the abrasive areas of the dressing tool.

6. Method according to claim 5, wherein the dressing is carried out by performing a plurality of dressing passes, in which the dressing tool is moved relatively to the grinding tool in axial direction (Y) with a respective constant radial infeed (X).

7. Method according to claim 1, wherein a pre-profiled grinding worm is used for creating profile modifications on the flanks of the grinding worm.

8. Method according to claim 1, wherein also a root region and/or a tip region of the tooth-shaped profile is dressed by pivoting of the dressing tool around the axis (A).

9. Method according to claim 1, wherein a tip region of the tooth-shaped profile is dressed by using a dressing bar.

10. Method for the dressing of a grinding tool, which has at least one tooth-shaped profile in an axial section, wherein the tooth-shaped profile has a first flank and a second flank being arranged opposed to the first flank, which form the boundary of the tooth-shaped profile, comprising: using a disk-shaped dressing tool for dressing of the grinding tool, the disk-shaped dressing tool having a first abrasive area and a second abrasive area wherein the dressing tool, having a relative velocity between the abrasive areas and the tooth-shaped profile, is guided relatively to the grinding tool, to shape the flanks, wherein the first abrasive area is assigned to the first flank and the second abrasive area is assigned to the second flank,
wherein
at least along a part of the height of the tooth-shaped profile the disk-shaped dressing tool is guided in such a way that the first abrasive area contacts the first flank and the second abrasive area contacts the second flank simultaneously, whereto one of or both of the disk-shaped dressing tool and the grinding tool are pivoted relatively to each other around an axis (A) so that both flanks are dressed simultaneously, wherein the disk-shaped dressing tool rotates around an axis of rotation (B), the grinding tool rotates around an axis of rotation (C), the axis of rotation (B) and the axis of rotation (C) define a plane in the non-pivoted state, the axis (A) is perpendicular to axis of rotation (C) and the axis (A) is contained in the plane, and
wherein
a tip region of the tooth-shaped profile is dressed by using a dressing bar.

* * * * *